2 Sheets—Sheet 1.

V. MOORE.

MUSIC STAND AND PORTFOLIO.

No. 11,066. Reissued Mar. 11, 1890.

Witnesses
F. M. Burnham
Charles J. Stockman

Inventor
Viola Moore

By Attorney
Geo. C. Boone

V. MOORE.

MUSIC STAND AND PORTFOLIO.

No. 11,066. Reissued Mar. 11, 1890.

Witnesses
F. M. Burnham
Charles J. Stockman

Inventor
Viola Moore

By her Attorney
Jno R. Boone

UNITED STATES PATENT OFFICE.

VIOLA MOORE, OF SAN FRANCISCO, CALIFORNIA.

MUSIC STAND AND PORTFOLIO.

SPECIFICATION forming part of Reissued Letters Patent No. 11,066, dated March 11, 1890.

Original No. 405,715, dated June 25, 1889. Application for reissue filed September 24, 1889. Serial No. 324,956.

*To all whom it may concern:*

Be it known that I, VIOLA MOORE, a citizen of the United States, residing at San Francisco, in the county of San Francisco and State of California, have invented a new and useful Improvement in Music Stands and Portfolios, of which the following is a specification.

The invention relates to improvements in music stands and portfolios.

The object of the present invention is to provide a music-receptacle designed to be attached to the under side of a piano and capable of adjustment to diminish or increase its capacity, and adapted to be swung out from under the piano to expose the contents and enable such to be handled with convenience.

The invention consists in the construction and novel combination and arrangement of parts hereinafter fully described, illustrated in the accompanying drawings, and pointed out in the claims hereto appended.

Figure 1:
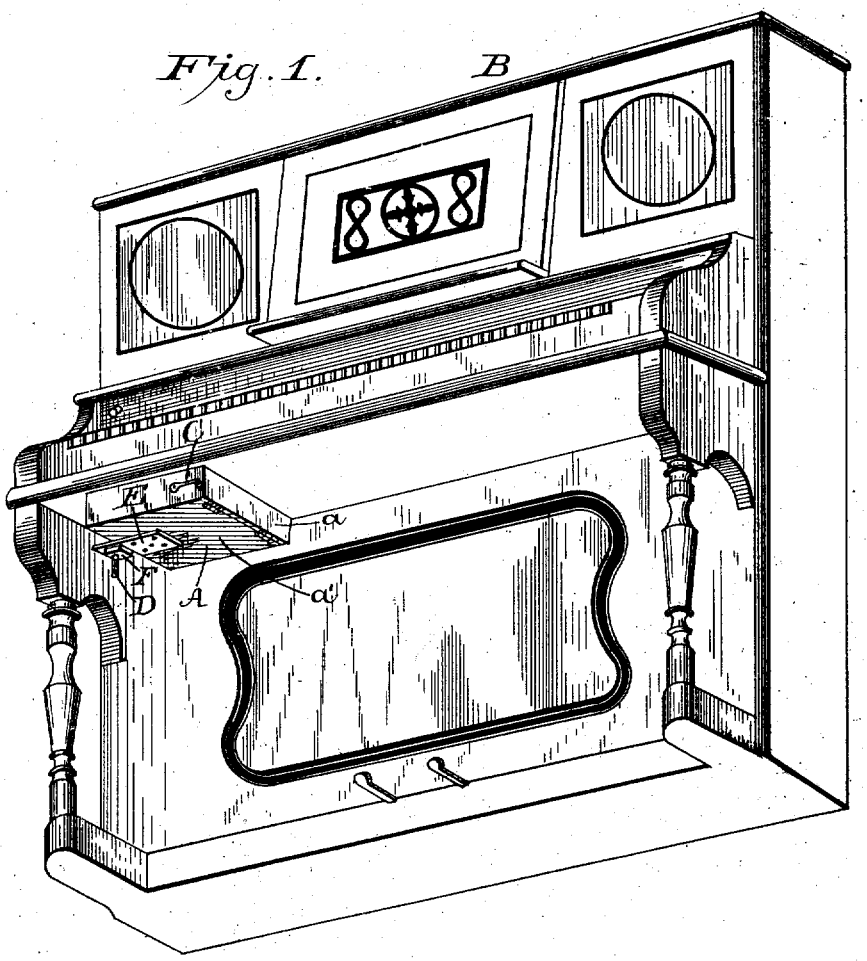
Figure 2:
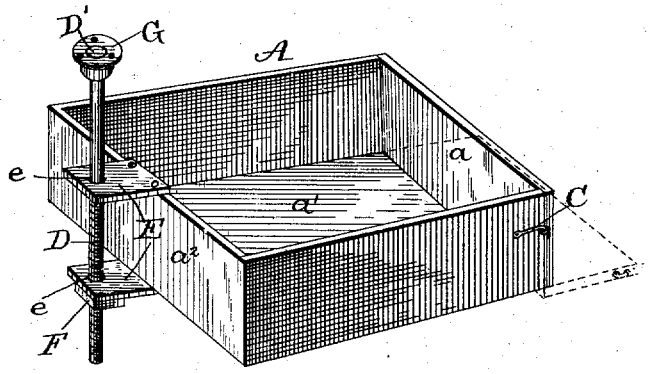
Figure 3:
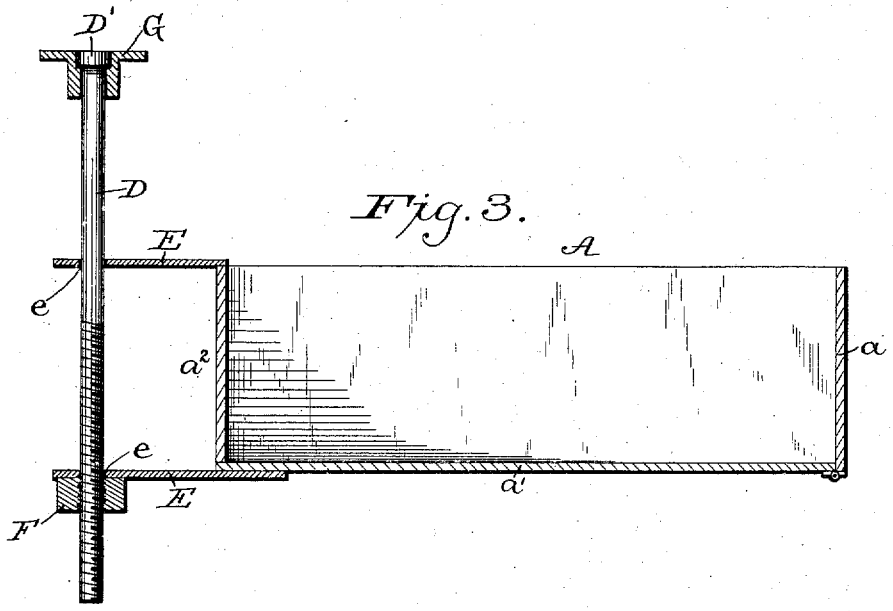

In the accompanying drawings, Figure 1 is a perspective view of a portion of a piano provided with the improved music-holder. Fig. 2 is a perspective view of the music-receptacle and means for attaching it to a piano. Fig. 3 is a longitudinal section of the same.

Referring to the accompanying drawings, A designates a drawer or box or other receptacle, constructed of wood or some other light material, designed to contain music and be secured to the under side of a piano B, by means hereinafter fully described. The end *a* of the box or drawer is hinged to the bottom *a'*, and may be lowered, as illustrated in Fig. 2, to facilitate the removal of the contents of the box or drawer A. The hinged end *a* is secured in its vertical position by any suitable means, preferably by hooks and eyes C, and I desire it to be understood that I do not limit myself to the precise construction of box herein shown and described, as I may prefer to employ other constructions—such as folding or knockdown boxes—to effect total concealment of the device when not in use.

The drawer or box A is secured to a rod D, depending from the piano B, by means of two arms E, extending out laterally from the end $a^2$ of the box or drawer A. These arms E are secured to the top and bottom of the end $a^2$, and are provided at their outer ends with eyes or openings *e*, through which passes the depending rod D, which is screw-threaded throughout its length and provided with an adjusting-nut F, that forms a support for the lower one of the lateral arms E. By this construction the box or drawer A may be secured at any position on the depending rod D, and the distance between the drawer or box A and the bottom of the piano B be regulated, whereby the device may be adjusted to contain either a large or small amount of music, the space between the bottom of the box and the under side of the piano being designed for music, and the box and contents may be removed from the piano when desired.

The upper end of the depending rod D passes through a plate G, and is headed or provided with a nut D', in order to swivel it to the plate G, which is secured by screws or similar means to the under side of the piano B, preferably beneath the key-board.

The music-receptacle when not in use is swung beneath the piano out of the way, and when it is desired to gain access to its contents it is swung out again.

From the foregoing description and the accompanying drawings the construction, operation, and advantages of the invention will readily be understood.

Having described my invention, what I claim is—

1. In a device of the character herein set forth, the combination, with a screw-threaded rod designed to be secured beneath a piano or other box-shaped musical instrument, of a box or drawer through which said rod passes, said box or drawer being supported and vertically adjustable on said rod by means of a nut, and also adapted to be swung around, for the purpose specified.

2. A music-receptacle designed to be suspended from a piano or other box-shaped musical instrument and comprising a box or drawer, a screw-threaded rod suspending the same, and a nut on said rod, serving both to support and adjust vertically the box or drawer on the rod.

3. A music-receptacle designed to be suspended from a piano or other box-shaped musical instrument, and comprising a box or drawer having laterally-projecting arms, a screw-threaded rod passing through said arms and suspending said box or drawer, and a nut on said rod beneath said box or drawer, and serving to support and adjust vertically the box or drawer on the rod.

4. In a device of the character herein described, a swiveled rod, in combination with a music-receptacle suspended by said rod, the lower end of said rod being screw-threaded, and a nut, substantially as shown and described, whereby the receptacle is capable of vertical adjustment and can be swung horizontally, for the purpose set forth.

5. A music-receptacle comprising the box or drawer having laterally-projecting arms and a rod designed to be secured beneath a piano, said box or drawer being vertically adjustable on the rod and adapted to be swung around the same, the outer end of the box being hinged, substantially as described.

6. A music-receptacle comprising the box or drawer having laterally-projecting arms, a plate designed to be secured to a piano, and a rod swiveled to the plate and depending therefrom, said box or drawer being vertically adjustable on the depending rod, substantially as described.

7. A music-receptacle comprising a box or drawer having laterally-extending arms provided with eyes or openings, a plate designed to be secured to a piano, and a rod depending from said plate and passing through the eyes or openings of the lateral arms, said rod being threaded and provided with an adjusting-nut, substantially as described.

8. A vertically-adjustable swinging music-receptacle comprising a box or drawer, a plate designed to be secured to a piano or other box-shaped musical instrument, a rod supporting said box or drawer, said rod swiveled at its upper end to said plate, and means for adjusting said box or drawer vertically on said rod.

In testimony that I claim the foregoing as my own I have hereto affixed my signature in presence of two witnesses.

VIOLA MOORE.

Witnesses:
M. G. LOEFLER,
J. A. VAUGHAN.